E. J. FUTTERER.
ACCIDENT PREVENTING ATTACHMENT FOR VEHICLES.
APPLICATION FILED MAR. 30, 1918.
1,386,172.
Patented Aug. 2, 1921.
2 SHEETS—SHEET 1.
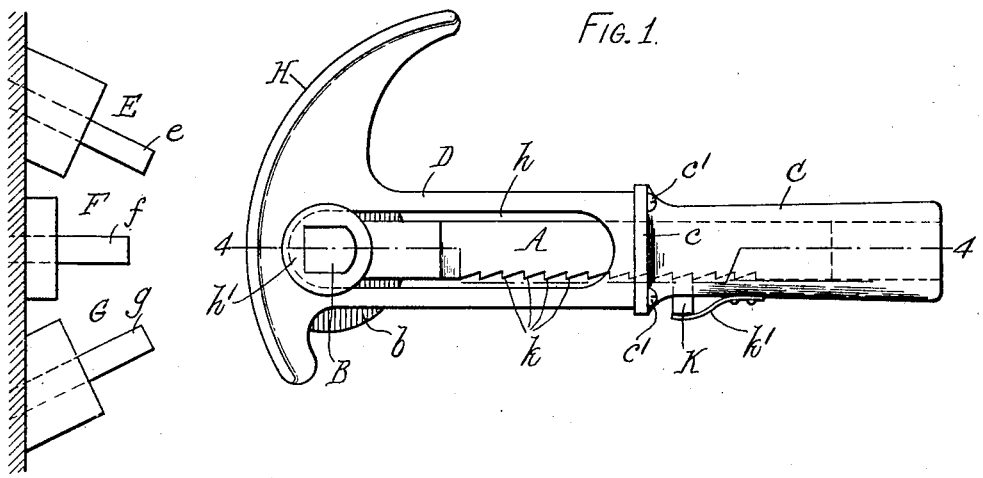
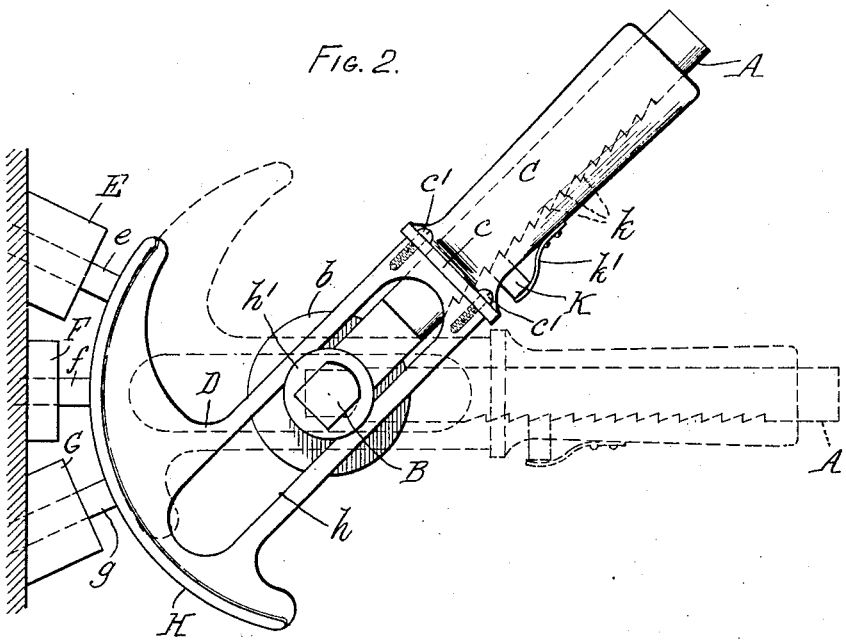
INVENTOR.
Edward J. Futterer,
By Wilhelm Parker,
ATTORNEYS.

E. J. FUTTERER.
ACCIDENT PREVENTING ATTACHMENT FOR VEHICLES.
APPLICATION FILED MAR. 30, 1918.
1,386,172.
Patented Aug. 2, 1921.
2 SHEETS—SHEET 2.
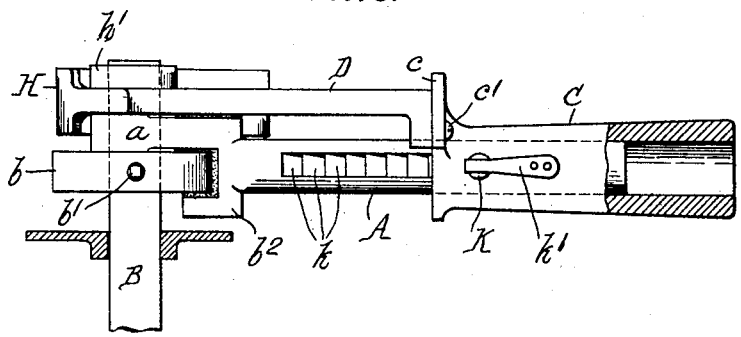
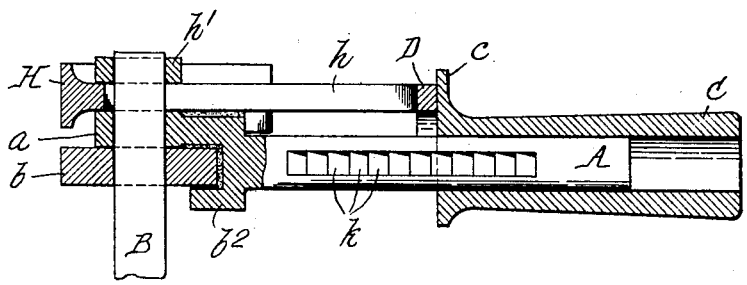
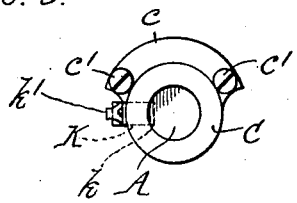
INVENTOR.
Edward J. Futterer,
by Wilhelm Parker,
ATTORNEYS.

UNITED STATES PATENT OFFICE.

EDWARD J. FUTTERER, OF BUFFALO, NEW YORK.

ACCIDENT-PREVENTING ATTACHMENT FOR VEHICLES.

1,386,172.  Specification of Letters Patent.  Patented Aug. 2, 1921.

Application filed March 30, 1918. Serial No. 225,713.

*To all whom it may concern:*

Be it known that I, EDWARD J. FUTTERER, a citizen of the United States, residing at Buffalo, in the county of Erie and State of New York, have invented a new and useful Improvement in Accident-Preventing Attachments for Vehicles, of which the following is a specification.

This invention relates to attachments or means adapted to be used in connection with a brake or controller handle of a vehicle for actuating simultaneously a number of appliances or devices intended to prevent accident or collision.

The objects of the invention are to provide an attachment of this kind which is positive and reliable in its action and which can be quickly actuated to avoid accidents; also to provide an attachment of this kind which may be actuated at any time regardless of the position of the brake or controller handle; also to provide a device of this kind which will be retained in its operative position until released; also to provide a device or attachment of this kind which is easily applied to any brake or controller handle and which will not in any way interfere with the customary operation of the brake or controller handle; also to provide an attachment of this kind with a part which is grasped by the hand of the operator whenever he is operating the vehicle, so that the actuation of the emergency devices or appliances may be instantaneous; also to improve the construction of devices of this kind in other respects hereinafter specified.

In order to do all that is possible to prevent accidents on electric cars, locomotives, or other vehicles, it is necessary for the motorman or operative to drop a life guard, to operate the sanding device which drops sand on the track, and also to actuate a gong or other signal to warn the person who is in danger of being injured, in addition to turning off the power and applying the brakes. This usually requires the actuation of three different valves, levers or the like, as well as necessitating the actuation of the controller and brake handles, and accidents have frequently occurred which could have been avoided if the several acts could have been more quickly accomplished. The time which elapses between the interval at which the danger is first noticed and the occurrence of the accident is frequently so short that it is almost impossible for the motorman to perform all of these acts, and it is therefore desirable to provide a device by means of which these various acts can be performed almost instantaneously.

In the accompanying drawings:

Figure 1 is a top plan view of a safety appliance embodying the invention showing the same in its inoperative position.

Fig. 2 is a similar view thereof showing the safety appliance in its operative position.

Fig. 3 is a side elevation thereof, partly in section, showing the appliance in its inoperative position.

Fig. 4 is a longitudinal sectional elevation thereof on line 4—4, Fig. 1.

Fig. 5 is an end elevation thereof.

The safety attachment is shown in the accompanying drawings as used in connection with the air brake handle of a car or locomotive, but it is understood that it is not intended to limit this invention to use with air brake handles since the same can be applied to any other handle or device used in connection with the operation of a vehicle.

A represents an air brake handle or controlling device, which is provided with a hub portion $a$ suitably secured to a rod or shaft B which is connected with valves or other means (not shown) for controlling the brakes. The brake handle is preferably held in place in the usual manner, for example, by means of an annular table or disk $b$ adapted to be secured to the rod or shaft B by means of a set screw $b'$ or the like, and the hub portion of the brake handle has a spur or extension $b^2$ engaging the lower surface of the table or disk $b$ and thus holding the brake handle on the rod or shaft B. This handle is preferably of the kind commonly used with air brakes but may be of any other suitable or desired construction.

The safety attachment comprises a handle or sleeve portion C which is slidably arranged on the controlling handle A and which is adapted to be grasped by the hand of the operator in actuating the brake shaft B in the ordinary operation of the car, and which is connected with a slide member or part D which is adapted to engage one or more actuating devices or members E F and G which may be connected by any suitable means (not shown) with, for example, a device for releasing the life-guard to cause the same to drop or move into its operative position, with a device for causing sand to be spread on the car tracks and with a bell or other signal for actuating the same. These actuating devices may be of any suitable construction and may be either electrically or pneumatically connected with the safety appliances which they actuate, being provided in the construction shown with plungers *e f* and *g* which, when moved inwardly, cause the actuation of the several safety appliances with which the actuating devices or members are connected. The safety appliances are not shown in the drawings and may be of any usual or suitable construction and of themselves constitute no part of this invention.

The sleeve or handle C may be connected with the slide D in any suitable manner. In the construction shown, the sleeve or handle is provided with a flange *c* to which one end of the slide D is secured by means of screws *c'* or the like. The slide is preferably so formed as to be capable of engaging all of the plungers *e f* and *g* in any position of the controlling or brake handle A. In the construction shown for this purpose the slide is provided at its outer end with a curved or segmental portion H, which, when the slide D and sleeve C are in their inoperative positions, will be out of actuating engagement with the plungers, as shown in Fig. 1, and which, when the slide and sleeve are moved to their operative positions, will press the plungers into the actuating devices E, F and G, as shown in Fig. 2. The segmental portion H is of sufficient circumferential length to engage the plungers whether the handle A is in its operative or inoperative position. The slide D may be mounted on the brake or controlling handle A or on the rod or shaft B in any suitable manner, being provided for this purpose, in the construction shown, with a slot *h* through which the rod or shaft B extends. A collar *h'* on the shaft B holds the slide in operative relation to the shaft.

Means are preferably provided for releasably holding the slide in the operative position so that the actuation of the several safety appliances is continued even if the motorman's hold on the brake handle is released. In the construction shown for this purpose, the brake handle A is preferably provided with ratchet teeth *k*, and a spring-pressed pawl or latch K is arranged in the slide C, that shown being in the form of a pin which is yieldingly held in engagement with the ratchet teeth by means of a spring *k'*. The ratchet teeth will permit the slide to move lengthwise of the handle A into operative position but will prevent the return movement unless the pin is withdrawn from engagement with the teeth.

In the ordinary operation of a car, the operator always has his hand on the brake handle and on the controller handle, and when the attachment described is used, the operator takes hold of the sleeve C instead of the brake handle A. The brakes may then be applied or released in the usual manner by simply turning the sleeve C about the axis of the shaft B without moving the slide lengthwise of the handle A. If the operator sees that there is danger of an accident or collision, he moves the slide lengthwise of the handle A as well as turning the handle A into the brake-applying position, as shown in Fig. 2. This single act on the part of the operator then causes the brakes to be applied, the life-guard to be dropped, the sand valve to be opened, and the bell or signal to be actuated, and the actuation of the safety appliances will continue even if the operator releases his hold on the handle. This attachment enables the operator to do in a single movement everything that is possible to prevent an accident and does not require him to exercise any presence of mind or speed. The attachment does not in any way interfere with the ordinary operation of the car or vehicle.

I claim as my invention:

1. The combination of an actuating member, operating mechanism therefor including a pivoted handle, a part on said handle adapted to be grasped by an operator in moving said handle and movable transversely with regard to the pivotal axis of said handle and said part including means for engaging said actuating member when said part is moved transversely to the pivotal axis of said handle, said means being adapted to engage said actuating member in any position of said handle.

2. The combination of an actuating member, a pivoted handle, an attachment adapted to be grasped by an operator in moving said handle and which is movable transversely with regard to the pivotal axis of said handle, said attachment including means for operating said actuating member when said attachment is moved transversely to the pivotal axis of said handle, said attachment being adapted to engage said actuating member in any position of said handle, and means for releasably holding said attachment against movement transversely of said axis.

3. The combination of a safety appliance, an actuating device and operating mechanism therefor including a controlling device, and an attachment mounted on said controlling device and which is slidable relatively thereto, said actuating device being arranged in operative relation to said slidable attachment and being adapted to be engaged by said slidable attachment when the same is slid relatively to said controlling device.

4. The combination of safety appliances and an operating mechanism therefor including a handle, an attachment including a part adapted to be grasped by an operator in moving said handle and which is slidable relatively to said handle, and means for actuating said safety appliances, which means are arranged in operative relation to said attachment and which are engaged when said part is slid relatively to the handle for causing the actuation of said safety appliances.

5. The combination of safety appliances and a handle adapted to be turned about its axis, an attachment slidably mounted on said handle, and actuating devices for said safety appliances arranged in operative relation to said handle, said attachment having a part adapted to engage said actuating devices in any position of said handle.

6. The combination of safety appliances and a handle adapted to be turned about its axis, means which are arranged in operative relation to said handle and which are adapted to actuate said safety appliances, and an attachment arranged on said handle and movable relatively thereto, said attachment having a circumferential portion adapted to engage said actuating means to cause the actuation of said appliances when said attachment is moved relatively to said handle into engagement with said actuating means.

7. The combination of safety appliances and a handle adapted to be turned about its axis, means which are arranged in operative relation to said handle and which are adapted to actuate said safety appliances, a slide mounted on said handle and having a part adapted to be grasped by the operator in moving said handle, and a part which is adapted to engage said actuating means when said slide is moved relatively to said handle.

8. The combination of safety appliances and a controlling device, of an attachment including a movable part which is arranged in operative relation to said controlling device, an actuating device for said safety appliances adapted to be engaged by said movable part for causing the actuation of said appliances, and means for releasably holding said movable part in a position in which said part engages said actuating device.

9. The combination of a safety appliance, a handle, an actuating device for said safety appliance arranged in operative relation to said handle, a member slidably arranged on said handle and adapted to be moved into engagement with said actuating device, and a detent for releasably holding said sliding member in a position in which said member engages said actuating devices.

Witness my hand, this 22 day of March, 1918.

EDWARD J. FUTTERER.

Witnesses:
 REDMOND J. WALSH,
 L. H. STICKLE.